United States Patent Office 2,899,447
Patented Aug. 11, 1959

2,899,447

11,17 DISUBSTITUTED 3 KETO-$\Delta^{1,4,6}$ ANDROSTATRIENES

David H. Gould, Leonia, Hershel L. Herzog, Mountain View, and Emanuel B. Hershberg, West Orange, N.J., assignors to Schering Corporation, Bloomfield, N.J., a corporation of New Jersey No Drawing. Application January 25, 1957
Serial No. 636,229

13 Claims. (Cl. 260—397.3)

This invention relates to a new group of steroid compounds which possess valuable therapeutic properties, and to the methods for preparing same. More particularly, this invention relates to 3-keto-1,4,6-androstatrienes and their 9α-fluoro analogues which possess at the 17-position a keto or hydroxyl group.

The new compounds are useful anabolic agents in the treatment of cachexia, and in regenerating tissue loss due to burns, or protein loss following an operation. These compounds cause a beneficial euphoria. In addition, they are useful as pituitary regulators. When fluorine is present in the 9-position, not only are the above therapeutic activities greatly enhanced, but the compounds exhibit anti-inflammatory properties.

The compounds of our invention may be represented by the following formula:

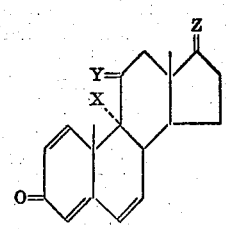

wherein X is a member of the group consisting of hydrogen and fluorine; Y is a member of the group consisting of

and =O; and Z is a member of the group consisting of =O,

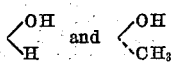

The 17-keto androstatrienes of this invention may be prepared by the sodium bismuthate or chromic anhydride oxidation of a 3,20-diketo-1,4,6-pregnatriene or its 9α-fluoro analogue whose preparations are described in copending patent application of Gould et al., Serial No. 513,901, filed June 7, 1955. The 17-keto group of these compounds may be selectively reduced to a β-hydroxy group by means of the microbiological activity of *Saccharomyces cerevisiae*.

To prepare the new compounds wherein X=H and

we prefer to employ the following sequence of reactions:

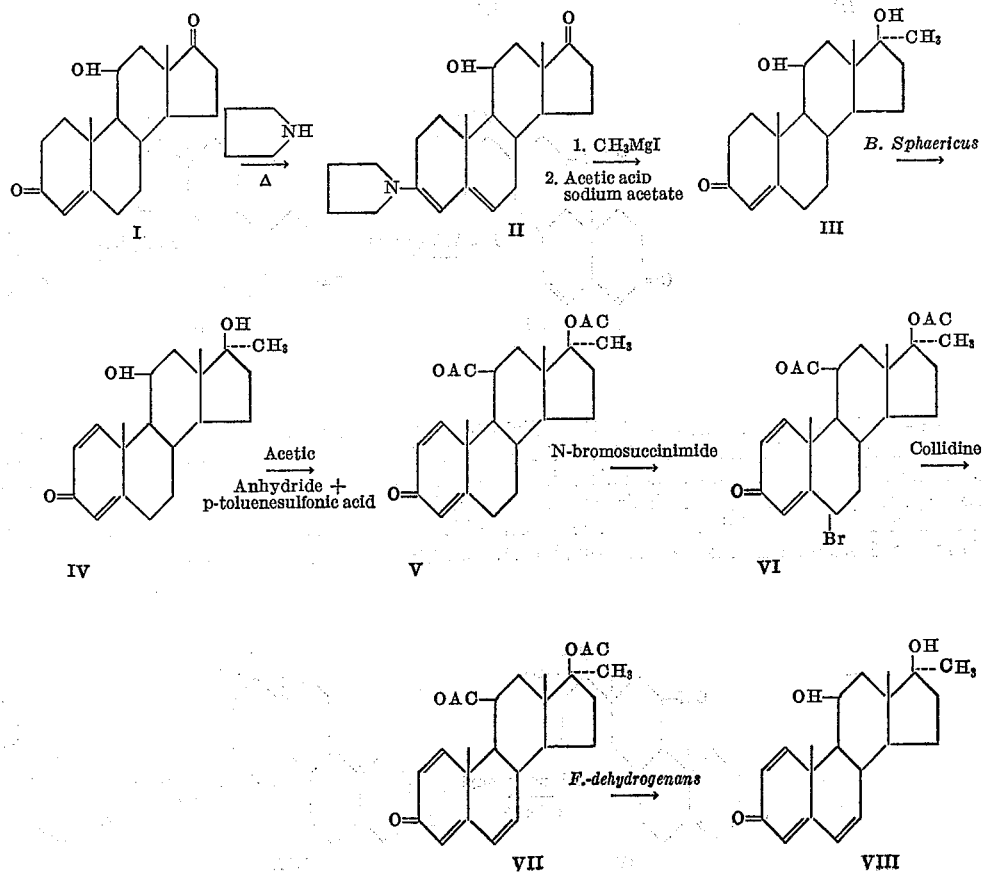

In the foregoing sequence, the 3-keto group of 4-androstene-11β-ol-3,17-dione (I) is selectively protected such as by forming the eneamine, II. Reaction of II with methyl magnesium halide in a conventional Grignard reaction followed by hydrolysis yields 17α-methyl-4-androstene - 11β,17β - diol - 3 - one (III). A-ring dehydrogenation whereby III is converted to the 1,4-diene, IV, is conveniently effected microbiologically by means of *B. Sphaericus* according to the procedure described in copending application of Charney et al., Serial No. 570,210, filed March 8, 1956. The diacetate, V, is formed in the usual manner and is brominated with an agent such as N-bromosuccinimide to form 6-bromo-17α-methyl - 1,4 - androstadiene - 11β,17β - diol - 3 - one 11,17-diacetate (VI). Dehydrobromination of this compound may be effected by refluxing with a tertiary amine such as collidine to obtain the 1,4,6-androstatriene 11,17-diacetate (VII). The diacetate, VII, may be saponified chemically or preferably microbiologically by means of the microorganism *Flavobacterium dehydrogenans* var. *hydrolyticum* according to the procedure described in copending application of Charney, Serial No. 458,661, filed September 27, 1954, now abandoned, yielding 17α-methyl-1,4,6-androstatriene-11β,17β-diol-3-one (VIII).

Alternatively, the triene VIII may be prepared according to the following reaction scheme:

drobromination is effected by refluxing compound X with a tertiary base such as collidine, yielding 17α-methyl-4,6-androstadiene - 11β,17β - diol - 3 - one 11,17 - diacetate (XI). Hydrolysis of XI by means of *Flavobacterium dehydrogenans* var. *hydrolyticum* gives the diol, XII. Δ¹-dehydrogenation of XII by *Bacillus sphaericus* yields the triene VIII.

The 11-keto compound, 17α-methyl-1,4,6-androstatriene-17β-ol-3,11-dione, may be prepared by any of the following methods:

(1) Oxidation of compounds VIII with chromic anhydride, (2) Employing the sequence of reactions from compounds I and VII, using 4-androstene-3,11,17-trione as the starting material. In this case, in view of the stability of the 17β-hydroxyl group in the presence of a 17α-methyl group, it is not necessary to prepare a protective acetate of the 17β-hydroxyl compound analogous to IV, i.e. 17α-methyl-1,4-androstadiene-17β-ol-3,11-dione.

(3) Employing the same reactions as in method 2, but introducing the double bonds in a different sequence. For example, the 11-keto compound corresponding to III, i.e. 17α-methyl-4-androstene-17β-ol-3,11-dione may first be brominated and subsequently dehydrobrominated to form the corresponding 4,6-androstadiene. This, in turn, may

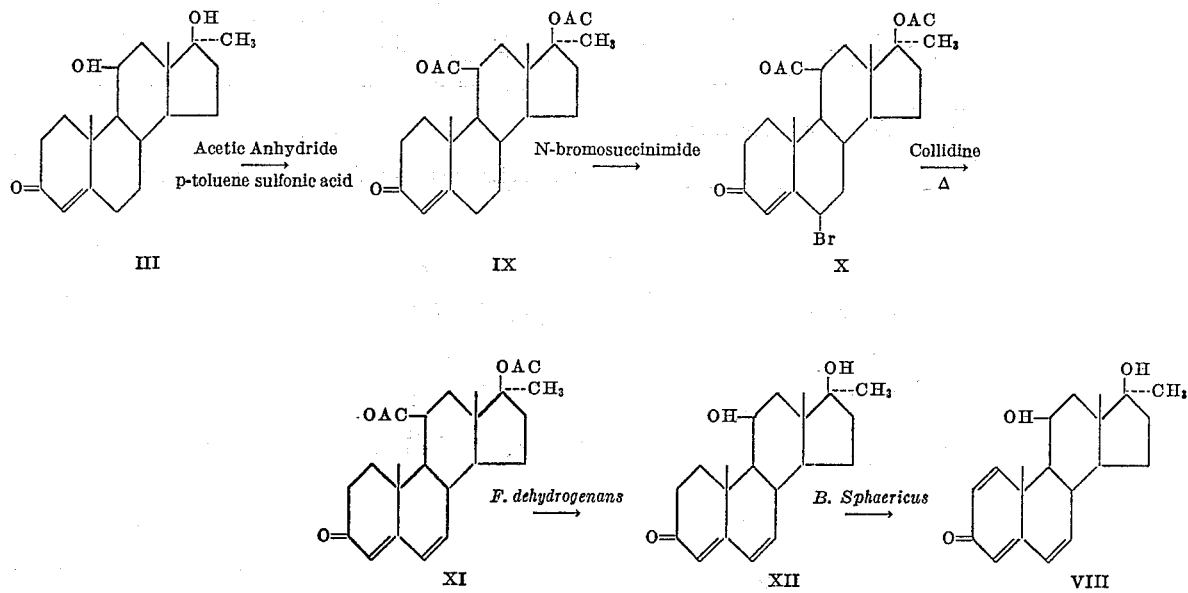

17α - methyl - 4 - androstene - 11β,17β - diol - 3 - one (III) is acetylated with acetic anhydride in the presence of a strong acid such as p-toluenesulfonic acid to yield the corresponding diacetate (IX). This, in turn, is brominated with N-bromosuccinimide or N-bromoacetamide to form the 6-bromo-4-androstene compound (X). Dehyfinally be subjected to the action of *B. sphaericus* to introduce the Δ¹ bond, so as to form a compound of this invention, i.e. 17α-methyl-1,4,6-androstatriene-17β-ol-3,11-dione.

Compounds of the general formula containing a 17α-methyl and a 9α-fluoro group are prepared as follows:

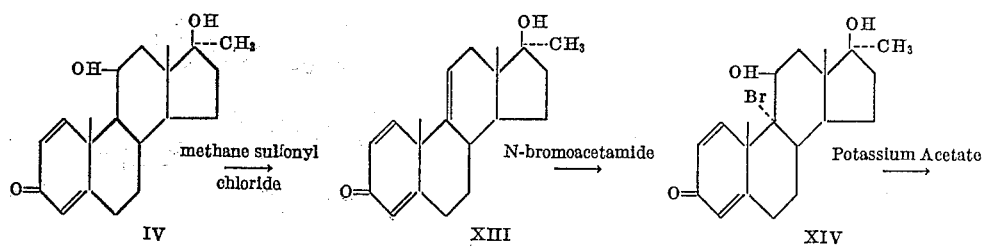

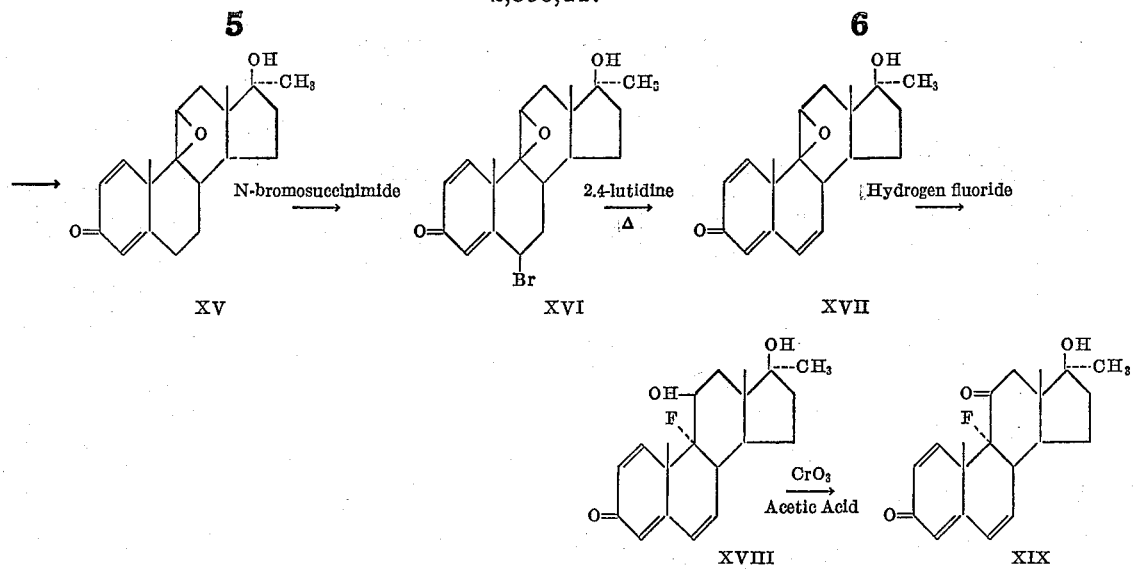

17α-methyl-1,4-androstadiene-11β,17β-diol-3-one (IV) is dehydrated with an agent such as methane sulfonyl chloride to form the 1,4,9(11)-androstatriene (XIII) which, in turn, is hydroxy-brominated to the 9α-bromo-11β-hydroxy-diene (XIV) with N-bromoacetamide or N-bromosuccinimide. A dehydrobromination with a base such as potassium acetate follows to form the 9β,11β-oxido compound (XV). Bromination (compound XVI) is effected through the use of an agent such as N-bromosuccinimide, followed by dehydrobromination by refluxing in a tertiary base such as lutidine to obtain 17α-methyl-1,4,6-androstatriene-9β,11β-oxido-17β-ol (XVII). The addition of hydrogen fluoride converts this product to a compound of this invention, 9α-fluoro-17α-methyl-1,4,6-androstatriene-11β,17β-diol-3-one (XVIII). When XVIII is oxidized in a conventional manner with chromic anhydride in acetic acid, the corresponding 11-keto compound of this invention (XIX) is obtained.

The intermediate XIII, is alternatively prepared by dehydrating 17α-methyl-4-androstene-11β,17β-diol-3-one (III) with an agent such as methane sulfonyl chloride to form 17α-methyl-4,9(11)-androstadiene-17β-ol-3-one, which may then be subjected to the action of *Bacillus sphaericus* var. *fusiformis* to obtain 17α-methyl-1,4,9(11)-androstatriene-17β-ol-3-one (XIII).

The foregoing is more fully described in the following examples which are not to be construed as limiting the scope of this invention, but are given for illustrative purposes only.

EXAMPLE 1

*1,4,6-androstatriene-11β-ol-3,17-dione*

The requisite intermediate, 1,4,6-pregnatriene-11β,17α,21-triol-3,20-dione is prepared as described in copending patent application, Serial No. 513,901, filed on June 7, 1955, by David H. Gould and Hershel L. Herzog.

A sample of 0.5 g. of 1,4,6-pregnatriene-11β,17α,21-triol-3,20-dione is dissolved with warming in 50 ml. of acetic acid and 50 ml. of water is added. Sodium bismuthate (8 g.) is added and the mixture is stirred overnight at room temperature. The solid is filtered, washed with methylene chloride, then discarded. The filtrate is further diluted with water, extracted with methylene chloride and washed neutral with sodium bicarbonate solution. The dried solution is evaporated to a residue which is crystallized from acetone-hexane to yield the pure 1,4,6-androstatriene-11β-ol-3,17-dione.

EXAMPLE 2

*1,4,6-androstatriene-3,11,17-trione*

The requisite intermediate, 1,4,6-pregnatriene-17α,21-diol-3,11,20-trione is prepared as described in copending patent application, Serial No. 513,901, filed June 7, 1955, by David H. Gould and Hershel L. Herzog.

1,4,6-pregnatriene-17α,21-diol-3,11,20-trione is treated as in Example 1. The residue is the crude 1,4,6-androstatriene-3,11,17-trione and is crystallized from acetone-hexane, M.P. 215° C. (dec.).

EXAMPLE 3

*1,4,6-androstatriene-11β,17β-diol-3-one*

A culture of *Saccharomyces cerevisiae* (A.T.C.C. 4125) is grown for 48 hours on an agar medium of the following composition: yeast extract (Difco), 10 g.; cerelose, 60 g.; potassium dihydrogen phosphate, 4.49 g.; disodium hydrogen phosphate, 8.83 g.; agar, 20 g.; and tap water to make 1 liter. The cell material from one agar slant is suspended in 5 ml. of saline. One ml. of this suspension is added to 100 ml. of the aforedescribed medium (without agar) in a 300 ml. Erlenmeyer flask. The resulting mixture is incubated at 30° on a shaker for 24 hours.

A fermenter containing 2 liters of the agar-free medium is inoculated with the 100 ml. of incubated mixture prepared previously, and is then aerated at a rate of one and one-half volumes of air per volume of medium per minute. After 6 hours of growth, 2 g. of the product of Example 1 in 50 ml. of ethanol is added to the fermenter and the reaction is allowed to proceed for 96 hours. The pH of the broth is then adjusted to 3.5 with dilute hydrochloric acid, and the reaction mixture extracted thoroughly with chloroform. The chloroform extracts are concentrated, the resulting oily residue is taken up in hexane, and extracted three times with 90% aqueous ethanol. The combined ethanol extracts are concentrated to the crude, substance 1,4,6-androstatriene-11β,17β-diol-3-one which is then purified by crystallization from acetone-hexane.

EXAMPLE 4

*1,4,6-androstatriene-17β-ol-3,11-dione*

The requisite intermediate 1,4,6-androstatriene-3,11,17-trione, prepared as in Example 2, is subjected to the action of a culture of *Saccharomyces cerevisiae* in the manner outlined in Example 3 to obtain 1,4,6-androstatriene-17β-ol-3,11-dione.

EXAMPLE 5

*17 methyl-1,4,6-androstatriene-11β,17β-diol-3-one*

(A) *3-pyrrolidino-3,5-androstadiene-11β-ol-17-one.*—A sample of 5 g. of 4-androsten-11β-ol-3,17-dione is suspended in 20 ml. of methanol and nitrogen is passed through to displace air. The mixture is heated to reflux and methanol is added dropwise to complete solution. To the boiling solution is added 1.8 g. of pyrrolidine and the solution is boiled until crystals appear (about 5 min.). The mixture is chilled and filtered, and the solid, 3-pyrrolidino-3,5-androstadiene-11β-ol-17-one, is washed with cold methanol and dried in vacuo.

(B) *17-methyl-4-androstene-11β,17β-diol-3-one.*—A solution of 1 g. of the pyrrolidino androstadiene prepared as above in 50 ml. of anhydrous dioxane is treated dropwise with a solution of 0.51 g. of methyl magnesium iodide in 5 ml. of anhydrous ether under a nitrogen atmosphere and anhydrous conditions. After the addition is complete, the mixture is refluxed gently for ½ hour, then treated cautiously with 1 ml. of water. The mixture is filtered. The filtrate is concentrated in vacuo to 5 ml. and diluted with 50 ml. of 5% acetic acid containing 0.5 g. of sodium acetate. The reaction mixture is heated on a steam bath for 30 minutes. The precipitate, 17-methyl-4-androstene-11β,17β-diol-3-one, is collected and crystallized from acetone-hexane.

(C) *17-methyl-1,4-androstadiene-11β,17β-diol-3-one.*— *Bacillus sphaericus* var. *fusiformis* (A.T.C.C. 7055) is incubated on nutrient agar for 24 hours at 28° C. One loopful of the culture is then transferred to 100 ml. of sterile 1% yeast extract (Basamin-Busch) of pH 6.8. The inoculated culture is incubated on a shaking machine for 6 hours at 28° C. and the resultant broth culture is used as a standard inoculum at a level of 1%.

The standard inoculum is added to each of ten 300 ml. shake flasks containing respectively 100 ml. of 1% yeast extract at pH 6.8. Growth of the organism is followed turbidimetrically and the product of procedure B (50 mg. in 1 ml. of methanol/flask) is added at the peak of the growth curve. The transformation proceeds rapidly and is followed adequately by paper chromatography or polarography of aliquots from the shake flasks. When the substrate is completely transformed (12–24 hours), the contents of the remaining flasks are pooled, extracted exhaustively with chloroform, and the extracts are concentrated to a residue. The residual material is recrystallized from acetonehexane to give pure 17-methyl-1,4-androstadiene-11β,17β-diol-3-one.

(D) *17-methyl-1,4 - androstadiene - 11β,17β-diol-3-one 11,17-diacetate.*—To a solution of 5 g. of the androstadiene-diol of procedure C in 50 ml. of acetic anhydride and 50 ml. of glacial acetic acid is added 0.5 g. of p-toluenesulfonic acid. The reaction mixture is allowed to stand at room temperature overnight and is then treated with water. The resulting precipitate is removed by filtration, chromatographed on magnesium silicate eluting with 1:1 ether-hexane, and crystallized from ether-hexane yielding pure 17 - methyl - 1,4 - androstadiene - 11β,17β-diol-3-one 11,17-diacetate.

(E) *6 - bromo - 17 - methyl-1,4-androstadiene-11β,17β-diol-3-one 11,17-diacetate.*—2 grams of the diacetate prepared in procedure D are dissolved by boiling in 100 ml. of chlorobenzene and 50 ml. of carbontetrachloride. The solution is dried by distilling 5 ml. of the solvent, then 1.88 g. of N-bromo-succinimide is added.

The mixture is irradiated with a 200-watt photoflood lamp while refluxing for 15 minutes during which time succinimide crystallizes out. After cooling the mixture, the succinimide is filtered, washed with carbontetrachloride, and discarded. The organic solution is washed with water, dried, filtered, and evaporated in vacuo to a residue which is the 6-bromo-17-methyl-1,4-androstadiene-11β,17β-diol-3-one 11,17-diacetate.

(F) *17-methyl-1,4,6-androstatriene-11β,17β-diol-3-one 11,17-diacetate.*—To 15 ml. of refluxing dry collidine is added 0.5 g. of the 6-bromo-androstadiene of procedure E. After 30 minutes boiling during which solid precipitates, the mixture is cooled, poured into ice and water and the pH adjusted to 4–6 with dilute hydrochloric acid. The mixture is extracted three times with 25 ml. of methylene chloride, and the solution is washed with water, dried, filtered, and evaporated to dryness.

The residue is dissolved in a minimum of methylene chloride and chromatographed on activated magnesium silicate using hexane to develop the column. The fraction eluted with ether is crystallized further from ether-hexane, to give the pure 17-methyl-1,4,6-androstatriene-11β,17β-diol-3-one 11,17-diacetate.

(G) *17-methyl - 1,4,6 - androstatriene - 11β,17β-diol-3-one.*—A mixture is prepared of 1 g. of yeast extract concentrate and 1 ml. each of 2 M potassium dihydrogen phosphate and 2 M disodium phosphate in each 100 ml. Ten Erlenmeyer flasks (300 ml.) containing 100 ml. each are sterilized and inoculated with *Flavobacterium dehydrogenans* var. *hydrolyticum*. The flasks are shaken at 30° for 16 hours, and to each is added a solution of 50 mg. of the androstatriene diacetate of procedure F in 5 ml. of methanol. The cultures are shaken at 30° for 24 hours and the combined broths are extracted three times with 300 ml. of methylene chloride and the extract is dried, filtered and evaporated to dryness. The residue is crystallized from acetone-hexane to give pure 17-methyl-1,4,6-androstatriene-11β,17β-diol-3-one which is the desired compound of Example 5.

EXAMPLE 6

*17-methyl-1,4,6-androstatriene-17β-ol-3,11-dione*

Two grams of 17-methyl-1,4,6-androstatriene-11β,17β-diol-3-one is dissolved in 20 ml. of pyridine and added with stirring to a cooled slurry of 1 g. of chromic anhydride in 20 ml. of pyridine. The mixture is stirred overnight at room temperature, and then diluted with 40 ml. of 10% aqueous sodium sulfite, followed by stirring for 2 hours. The mixture is acidified with aqueous sulfuric acid and extracted with methylene chloride. This solution is washed neutral with water, dried, filtered and evaporated to a residue which is crude 17-methyl-1,4,6-androstatriene-17β-ol-3,11-dione. The pure product is obtained by crystallization of this residue from acetone-hexane.

Alternatively, the compound of this example may be prepared as follows:

(A) *3 - pyrrolidino - 3,5 - androstadiene - 11,17-dione.*—When 4-androstene-3,11,17-trione is reacted with pyrrolidine in the manner described in Example 5, procedure A, the compound 3-pyrrolidino-3,5-androstadiene-11,17-dione is obtained.

(B) *17 - methyl - 4 -androstene - 17β - ol - 3,11-dione.*—1 gram of the pyrrolidino androstadiene prepared as above is treated in the manner described in Example 5, procedure B. Crystallization of the crude precipitate from aqueous acetone yields the pure 17-methyl-4-androstene-17β-ol-3,11-dione.

(C) *17 - methyl - 1,4 - androstadiene - 17β - ol - 3,11-dione.*—The androstene compound of above procedure B is subjected to the action of a culture of *Bacillus sphaericus* in the manner described in Example 5, procedure C. The residue is crystallized from acetone to give 17-methyl-1,4-androstadiene-17β-ol-3,11-dione.

(D) *6 - bromo - 17 - methyl - 1,4 - androstadiene - 17β-ol-3,11-dione.*—The product of procedure C is brominated with N-bromosuccinimide as described in Example 5, procedure E. The residue is 6-bromo-17-methyl-1,4-androstadiene-17β-ol-3,11-dione.

(E) *17 - methyl - 1,4,6 - androstatriene - 17β - ol-3,11-dione.*—The 6-bromo product of above procedure D is dehydrobrominated with γ-collidine in the manner described in Example 5, procedure F. The fraction eluated with ether is crystallized further from ether-hexane to give pure 17 - methyl - 1,4,6 - androstatriene - 17β - ol-3,11-dione.

EXAMPLE 7

*9α-fluoro-1,4,6-androstatriene-11β-ol-3,17-dione*

The requisite intermediate, 9α - fluoro - 1,4,6 - pregnatriene-11β,17α,21-triol-3,20-dione is prepared as described in copending patent application, Serial No. 513,-

901, filed on June 7, 1955, by David H. Gould and Hershel L. Herzog.

As described in Example 1, 9α-fluoro-1,4,6-pregnatriene-11β,17α,21-triol is treated with sodium bismuthate and the residue is crystallized from methylene chloride-hexane to give 9α-fluoro-1,4,6-androstatriene-11β-ol-3,17-dione.

EXAMPLE 8

*9α-fluoro-1,4,6-androstatriene-3,11,17-trione*

The requisite intermediate, 9α-fluoro-1,4,6-pregnatriene-17α,21-diol-3,11,20-trione, is prepared as described in copending patent application, Serial No. 513,901, filed on June 7, 1955, by David H. Gould and Hershel L. Herzog.

9α-fluoro-1,4,6-pregnatriene-17α,21-diol-3,11,20-trione is treated as in Example 1 to give a residue which is recrystallized from methylene chloride-hexane to give 9α-fluoro-1,4,6-androstatriene-3,11,17-trione.

EXAMPLE 9

*9α-fluoro-1,4,6-androstatriene-11β-17β-diol-3-one*

The produce of Example 7 is subjected to the action of a culture of Saccharomyces cerevisae in the manner described in Example 3 to yield 9α-fluoro-1,4,6-androstatriene-11β,17β-diol-3-one which is purified by recrystallization from acetone-hexane.

EXAMPLE 10

*9α-fluoro-1,4,6-androstatriene-17β-ol-3,11-dione*

The product of Example 8 is subjected to the action of a culture of Saccharomyces cerevisae as described in Example 3 to yield 9α-fluoro-1,4,6-androstatriene-17β-ol-3,11-dione.

EXAMPLE 11

*9α-fluoro-17-methyl-1,4,6-androstatriene-11β,17β-diol-3-one*

(A) *17-methyl-1,4,9(11)-androstatriene-17β-ol-3-one.*—A sample of 5 grams of 17-methyl-1,4-androstatriene-11β,17β-diol-3-one, prepared as in Example 5, procedure C, is dissolved in 20 ml. of dimethylformamide and 4 ml. of dry pyridine. The solution is chilled and stirred, and 4.1 g. of methane sulfonyl chloride in 41 ml. of dimethylformamide is added.

After being stirred at room temperature for 20 hours, the mixture is poured into 200 ml. of water, and extracted twice with 100 ml. of methylene chloride. The organic layer is washed with 10% sodium bicarbonate and with water, dried and evaporated. The residue is crystallized from aqueous acetone to give 17-methyl-1,4,9(11)-androstatriene-17β-ol-3-one, λ max=238 mμ.

(B) *9α-bromo-17-methyl-1,4-androstadiene-11β,17β-diol-3-one.*—A sample of 2.5 g. of the product of Example 11, procedure A is dissolved in 250 ml. of dry tetrahydrofuran and 25 ml. of water. The solution is chilled with stirring to 5° and 2.5 g. of N-bromoacetamide is added. After the addition of 25 ml. of 1 N perchloric acid, the mixture is allowed to stand at room temperature for 48 hours.

The solution is diluted with 10% sodium sulfite and water and extracted with 200 ml. of chloroform twice. The extract is washed with water, dried, and evaporated to give a residue which is dissolved in acetone, treated with charcoal, filtered and diluted with hexane. The resulting precipitate is filtered and recrystallized from acetone-hexane, to give 9α-bromo-17-methyl-1,4-androstadiene-11β,17β-diol-3-one, λ max=242 mμ.

(C) *17-methyl-9β,11β-oxido-1,4-androstadiene-17β-ol-3-one.*—A sample of 2 g. of the product of Example 11, procedure B is dissolved in 200 ml. of acetone and 4 g. of potassium acetate is added. The solution is refluxed for 24 hours and evaporated to a residue in vacuo. Crystallization from acetone-hexane gives 17-methyl-9β,11β-oxido-1,4-androstadiene-17β-ol-3-one, λ max=249 mμ.

(D) *6-bromo-17-methyl-9β,11β-oxido-1,4-androstadiene-17β-ol-3-one.*—A sample of 2 g. of the product of example 11, procedure C is dissolved by boiling in 100 ml. of chlorobenzene and 50 ml. of carbon tetrachloride, and the solution is dried by distilling off 5 ml. of solvent. To the solution is added 1.19 g. of N-bromosuccinimide and the mixture is irradiated with a 200-watt photoflood lamp and refluxed for 15 minutes while succinimide crystallizes out. The mixture is cooled, filtered, and the filtrate is washed with water. The organic solution is dried over Na₂SO₄, filtered, and evaporated in vacuo to a residue of 6-bromo-17-methyl-9β,11β-oxido-1,4-androstadiene-17β-ol-3-one.

(E) *17-methyl-9β,11β-oxido-1,4,6-androstatriene-17β-ol-3-one.*—The product of Example 11, procedure D (1.0 g.) is treated as Example 5, procedure F using 30 ml. of 2,4-lutidine in place of γ-collidine. Chromatography and elution with ether gives the desired 17-methyl-9β,11β-oxido-1,4,6-androstatriene-17β-ol-3-one, recrystallizable from acetone-hexane, λ max=222, 258, 298 mμ.

(F) *9α-fluoro-17-methyl-1,4,6-androstene-11β,17β-diol-3-one.*—A sample of 1 g. of the product of Example 11, procedure E is dissolved in 100 ml. of anhydrous, alcohol-free chloroform and chilled to −60° in a Dry Ice-acetone bath. The stirred solution is treated with 1 g. of anhydrous hydrogen fluoride for 15 hours when the solution is washed with sodium bicarbonate solution, dried, filtered and evaporated.. The residue is chromatographed on activated magnesium silicate and the fraction eluted with ether is crystallized from acetone-hexane to give the desired product, λ max at 222, 255 and 296 mμ.

In the same manner, use of hydrogen chloride and hydrogen bromide in place of hydrogen fluoride, leads to 9α-chloro and 9α-bromo-17-methyl-1,4,6-androstatriene-11β,17β-diol-3-one, respectively.

EXAMPLE 12

*9α-fluoro-17-methyl-1,4,6-androstatriene-17β-ol-3,11-dione*

A sample of 0.5 g. of the product of Example 11 is dissolved in 15 ml. of acetic acid, stirred and treated with a solution of 95 mg. of chromic anhydride in 0.5 cc. of water to which 1.0 cc. of acetic acid is added. The solution is stirred 15 minutes, treated with methanol, stirred 30 minutes and poured into water. The precipitate is collected, dried and recrystallized from acetone-hexane to give the desired product.

We claim:

1. Steroid compounds having the following formula:

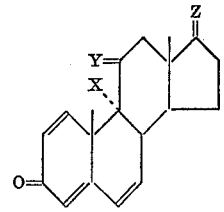

wherein X is a member of the group consisting of hydrogen and fluorine; Y is a member of the group consisting of $$\diagup^{OH}_{H}$$

and =O; and Z is a member of the group consisting of =O,

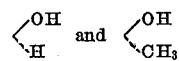

2. 1,4,6-androstatriene-11β-ol-3,17-dione.

3. 1,4,6-androstatriene-3,11,17-trione.
4. 1,4,6-androstatriene-11β,17β-diol-3-one.
5. 1,4,6-androstatriene-17β-ol-3,11-dione.
6. 17-methyl-1,4,6-androstatriene-11β,17β-diol-3-one.
7. 17-methyl-1,4,6-androstatriene-17β-ol-3,11-dione.
8. 9α-fluoro-1,4,6-androstatriene-17β-ol-3,11-dione.
9. 9α-fluoro-1,4,6-androstatriene-3,11,17-trione.
10. 9α-fluoro-1,4,6-androstatriene-11β,17β-diol-3-one.
11. 9α-fluoro-1,4,6-androstatriene-11β-ol-3,17-dione.
12. 9α-fluoro-17-methyl-1,4,6-androstatriene-11β,17β-diol-3-one.
13. 9α-fluoro-17-methyl-1,4,6-androstatriene-17β-ol-3,11-dione.

References Cited in the file of this patent
UNITED STATES PATENTS 2,705,237　　Djerassi et al. _____ Mar. 29, 1955